Oct. 31, 1961     S. S. KAHN     3,006,231
SHEET METAL LANCED NUT HAVING ALTERNATELY OFFSET STRAPS
Original Filed Jan. 28, 1957

INVENTOR
SIMON S. KAHN
BY *Robb & Robb*
ATTORNEYS

United States Patent Office 3,006,231
Patented Oct. 31, 1961

3,006,231
SHEET METAL LANCED NUT HAVING ALTERNATELY OFFSET STRAPS
Simon S. Kahn, Glen Ridge, N.J., assignor to General American Transportation Corporation, Chicago, Ill., a corporation of New York
Original application Jan. 28, 1957, Ser. No. 636,693, now Patent No. 2,917,966, dated Dec. 22, 1959. Divided and this application Apr. 30, 1959, Ser. No. 810,027
1 Claim. (Cl. 85—32)

The present application is a division of my co-pending application, Serial No. 636,693, filed January 28, 1957, now Patent No. 2,917,966, granted December 22, 1959, and relates generally to fasteners, and more particularly to lanced, sheet metal, screw retainers of the wing-nut type.

Heretofore, sheet metal wing-nut fasteners which comprise adjacently disposed halves oftentimes have a tendency to separate or split under continued or sustained normal usage, thus losing their useful holding power. Various means, including spot welding the halves together, have been used to prevent such separation of this type of wing-nut, but even spot welds, which entail an additional expense and step in the manufacture thereof, are not always infallible, particularly under severe conditions where heavy strains or vibration etc. may loosen the weld.

Accordingly it is an object of this invention to provide a novel sheet metal wing-nut, comprising adjacently disposed halves, so constructed and arranged that the nut will neither pull apart nor lose its useful holding power even when subjected to severe working conditions.

Another object of the present invention is to provide standardized, pre-formed, lanced, sheet metal, screw-receiving sockets of a unitary wing-nut form which lend themselves to quick and easy applications in any work position, and which have greater resistance to thread stripping than conventional stamped wing-nuts, due to their greater threaded engagement.

A further object of the invention is to provide fasteners that may be simply and inexpensively produced from flat material such as strips or other sheet metal blanks and which are so formed as to be capable of receiving either self-tapping screws or standard machine screws.

Other objects and advantages of the invention will be hereinafter described and the novel features thereof defined in the appended claim.

In the drawing.

Like reference characters designate corresponding parts throughout the several views of the drawing.

Figure 4:
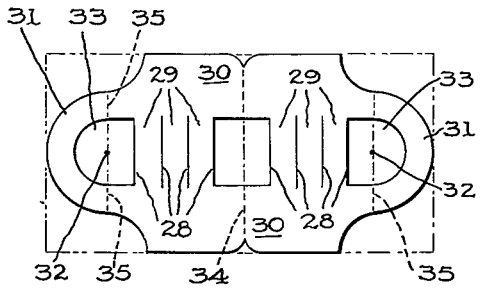
FIG. 4 illustrates a typical developed sheet metal blank from which the wing-nut may be formed in one piece.

The wing-nut fastener which is generally designated 27 may be fabricated from a one-piece stamping of sheet metal constituting the blank, as shown in FIG. 4. The blank preferably has stamped therethrough a plurality of parallel lanced slits 28 which define parallel straps 29 along its central longitudinal area, said straps terminating integrally at their ends with the edge portions of the blank, said portions subsequently becoming the wings 30. In producing the wing-nut, the blank at its opposite ends is reduced in width and preferably (but not necessarily) rounded for 180° as at 31, on a radius around the respective center points 32. An area, which may be of semi-circular shape, as at 33, is cut out about the respective center points 32 at each end of the blank, thereby better defining the radial end areas 31 which subsequently form the base flanges of the wing-nut. The reduced width at the ends is to give better definition to the winged areas 30 after the nut has been stamped.

The blank is bent over in half laterally and back upon itself along fold 34 so that the identical halves are disposed against each other in abutting relation. The two end areas 31 are bent outwardly along folds 35, said folds being parallel to fold 34, and in opposite directions, each 90° from the plane of the folded blank, said end portions 31 then lying in a common plane and constituting the base of the nut in which the semi-circular cut-out areas 33 join to form a circular cut-out area for admission of the screw 36. Although the base and its screw-admitting opening are shown as rounded, it is understood that they may be of any suitable screw admitting shape such as square or rectangular as desired; and further, the base of the nut need not be of reduced area but may be increased to the full width of the wing spread as may be desirable in certain types of applications, for example, for air cleaning devices and the like.

Figure 3:
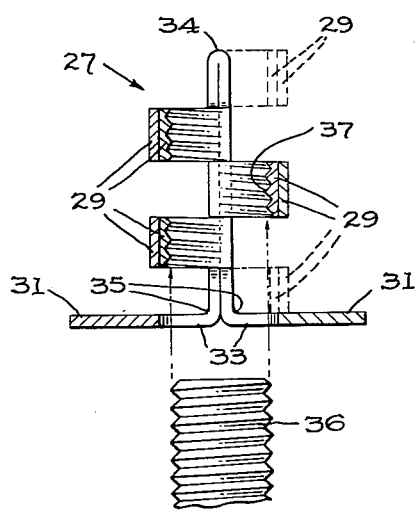
FIG. 3 is a vertical cross-section of the wing-nut shown in FIGS. 1 and 2.

To form the screw receiving socket in the wing-nut, each of the doubled strap members 29 formed by the lancings 28 is alternatively drawn or offset in opposite directions, each taking the form of substantially a semi-circular configuration. The plurality of opposed straps forms in effect a cylindrical socket whose internal surfaces may then be tapped in the conventional manner, or the threads 38 (best seen in FIG. 3) may be die stamped or otherwise formed during or subsequent to the lancing formation.

Due to the fact that the wing-nut is formed by folding and the double-thickness strap members are oppositely offset, there can be no separation of the two folded halves when the nut is in use. It is to be further understood that this embodiment can be made from two separate identical pieces in lieu of one folded in half, and that the fastener may be used with self-tapping screws of appropriate size, as well as with machine screws, by suitably conforming the same to the pitch and the diameter of the particular screw.

Figure 1:
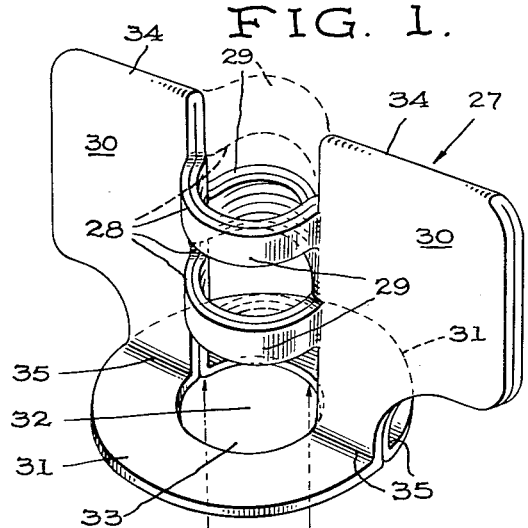
FIG. 1 is a perspective view of one illustrative form of the invention which is provided with tapped threads for cooperation with a machine screw.
Figure 2:
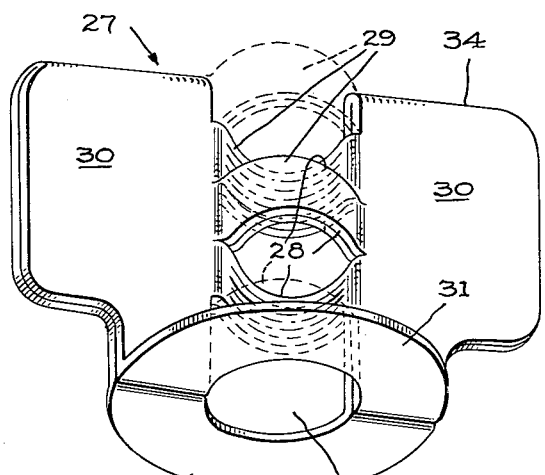
FIG. 2 is a perspective view from below and behind the wing-nut shown in FIG. 1.

It may be desirable to remove the lowermost and topmost lanced strap members 29 (shown in dotted outline in FIGS. 1, 2 and 3) in order to effect a full 360° circumferential clearance for better initial engagement with the screw, as well as for better appearance, and if so the remaining plurality of double-thick strap members affords sufficient threaded engagement with a screw, attended with very strong holding properties.

Lanced wing-nuts of this type have definite advantages over ordinary or conventional sheet metal stamped wing-nuts due to the greater threaded engagement which affords greater resistance to thread stripping, as well as due to the alternatively offset and opposed lanced thread-engaging strap members which positively preclude separation of the nut halves when in use.

It will be apparent to those skilled in the art that by the construction illustrated in the accompanying drawing and described above, there is provided an illustrative form of inexpensive, simple and effective machine screw and/or self-tapping screw retainer or wing-nut for use in constructions of many kinds. In addition to use with sheet-metal products, the invention may readily be adapted for uses such as inserts in molded plastic articles and the like.

While the specific details of the invention have been shown and described herein, other changes and alterations may be resorted to without departing from the

I claim:

A unitary screw-retaining article in the form of a wing-nut, said nut comprising a body fabricated from a flat blank of sheet material and forming symmetrical halves at opposite sides of a central laterally extended fold line, said blank having a plurality of parallel lanced perforations through substantially its longitudinal center, said perforations defining strap members intermediate each pair of perforations terminating in winged extremities at each side of the body, said blank also having oppositely symmetrical cut-out areas at its ends adjacent the respective outer-most strap members in spaced relation to its marginal extremities, and said blank being folded over on itself about said central fold line into duplicate oppositely aligned halves, with the strap members of the respective halves of the folded blank aligned in doubled contiguous relation, each of said end areas being bent oppositely outward along the lines of the respective outer-most strap members and so disposed that the cut-out areas join to form a screw-receiving apertured base of the wing-nut, said base being disposed in a transverse plane substantially perpendicular to the body of the nut, and the pairs of doubled strap members being alternately and arcuately offset in opposite directions and defining a generally cylindrical internally screw threaded socket, with the straps of the respective halves of the folded blank alternately disposed on opposite sides of the central axis of said socket and thereby positively interlocking said halves together when the wing-nut is applied onto a screw.

References Cited in the file of this patent

UNITED STATES PATENTS

| | | |
|---|---|---|
| 1,078,766 | Barr | Nov. 18, 1913 |
| 1,823,547 | Kaefer | Sept. 15, 1931 |
| 1,878,055 | Wittliff | Sept. 20, 1932 |
| 2,335,769 | Kissling | Nov. 30, 1943 |